(12) United States Patent
Wang

(10) Patent No.: US 8,126,453 B2
(45) Date of Patent: Feb. 28, 2012

(54) RADIO FREQUENCY TESTING SYSTEM AND METHOD OF PERFORMING RADIO FREQUENCY TEST ON A PLURALITY OF MOBILE COMMUNICATION DEVICES

(75) Inventor: Yong-Gang Wang, Shanghai (CN)

(73) Assignee: Inventec Appliances Corp., Taipei Hsien (TW)

( * ) Notice: Subject to any disclaimer, the term of this patent is extended or adjusted under 35 U.S.C. 154(b) by 386 days.

(21) Appl. No.: 12/576,229

(22) Filed: Oct. 8, 2009

(65) Prior Publication Data

US 2010/0093285 A1   Apr. 15, 2010

(30) Foreign Application Priority Data

Oct. 9, 2008 (TW) .............................. 97138988 A

(51) Int. Cl.
*H04W 24/00* (2009.01)
(52) U.S. Cl. ................. 455/425; 455/226.1; 455/67.11; 455/115.1
(58) Field of Classification Search .......... 455/423–425, 455/67.11–67.7, 115.1–115.4, 226.1–226.4
See application file for complete search history.

(56) References Cited

U.S. PATENT DOCUMENTS

| 6,066,953 | A  | * | 5/2000  | Wadell         | 324/601 |
|-----------|----|---|---------|----------------|---------|
| 7,359,701 | B2 | * | 4/2008  | Zhao et al.    | 455/423 |
| 7,508,868 | B2 | * | 3/2009  | Chang          | 375/224 |
| 7,555,294 | B2 | * | 6/2009  | Qi et al.      | 455/425 |
| 7,912,463 | B2 | * | 3/2011  | Jin et al.     | 455/425 |
| 2004/0207422 | A1 | * | 10/2004 | Lehtinen et al. | 324/758 |

* cited by examiner

*Primary Examiner* — Nay A Maung
*Assistant Examiner* — Angelica Perez
(74) *Attorney, Agent, or Firm* — CKC & Partners Co., Ltd.

(57) ABSTRACT

A radio frequency testing system and its method of performing a radio frequency test on a plurality of mobile communication devices are provided. The system simultaneously connects mobile communication devices for performing a pre-set procedure and an RF test in sequence. The system has an RF testing device for RF-testing the mobile communication devices in turn, a switch device for regulating an electrical connection between the RF testing device and any mobile communication device, and a controlling device for performing the pre-set procedure on some of the rest mobile communication devices before the one is finished performing the RF test.

13 Claims, 8 Drawing Sheets

RF test specification table 142

| Band | Level | TestItems | Upper_Limit | Lower_limit | Cellpower | Unit |
|---|---|---|---|---|---|---|
| GSM(400/850/900) | level (0-2) | TxPower | 2 | -2 | | dBm |
| GSM(400/850/900) | level (3-15) | TxPower | 3 | -3 | | dBm |
| GSM(400/850/900) | level (16-31) | TxPower | 5 | -5 | | dBm |
| GSM(1850/1900) | level (0-8) | TxPower | 3 | -3 | | dBm |
| GSM(1850/1900) | level (9-13) | TxPower | 4 | -4 | | dBm |
| GSM(1850/1900) | level (14-15) | TxPower | 5 | -5 | | dBm |
| | | BER | 2 | | -102 | % |

FIG.4B

RF variables setting table 143

| | Channel | level | Loss_A | Loss_B | Channel | level | Loss_A | Loss_B | Channel | level | Loss_A | Loss_B | Channel |
|---|---|---|---|---|---|---|---|---|---|---|---|---|---|
| Ch (128 - 251) | | | | | | | | | | | | | |
| GSM 850 | Low: | 128 | 5 | -1 | -1 | Mid: | 190 | 5 | -1 | -1 | High: | 251 |
| Ch (1 - 124) | | | | | | | | | | | | | |
| GSM 900 | Low: | 1 | 5 | -1 | -1 | Mid: | 62 | 5 | -1 | -1 | High: | 124 |
| Ch (512 - 885) | | | | | | | | | | | | | |
| GSM 1800 | Low: | 512 | 0 | -1 | -1 | Mid: | 699 | 0 | -1 | -1 | High: | 885 |
| Ch (512 - 810) | | | | | | | | | | | | | |
| GSM 1900 | Low: | 512 | 0 | -1 | -1 | Mid: | 661 | 0 | -1 | -1 | High: | 810 |
| Test Item | | | | | | | | | | | | | |
| Transmitter output power | | Output RF spectrum | | | | | | | | | | | |
| power Time | | Bit Error Rate | | | | | | | | | | | |
| Frequency Error and Phase Error | | Received Signal Strength | | | | | | | | | | | |

FIG.4C

RADIO FREQUENCY TESTING SYSTEM AND METHOD OF PERFORMING RADIO FREQUENCY TEST ON A PLURALITY OF MOBILE COMMUNICATION DEVICES

RELATED APPLICATIONS

This application claims priority to Taiwan Application Serial Number 97138988, filed Oct. 9, 2008, which is herein incorporated by reference.

BACKGROUND

1. Technical Field

The present invention relates to a testing system, more particularly to a radio frequency testing system and a method of performing a radio frequency test on a plurality of mobile communication devices by the radio frequency testing system.

2. Description of Related Art

Nowadays, production costs of mobile phones are increasing, but production cycles of the mobile phones are getting shorter. In order to meet the delivery date for handing over the finished products of these mobile phones, industry vendors therefore try to shorten the testing steps of the total production time of the mobile phones by heightening the efficiency of the testing steps.

When manufacturing mobile phones, each mobile phone needs to go through a series of testing steps after the mobile phone is assembled. Thus, the mobile phone will be packaged and launched to the markets only if the mobile phone passes.

A radio frequency (RF) testing step is one of the mentioned testing steps, and is a significant part of all the testing steps of the mobile phones. The time period of the RF test is directly connected to the capacity of a whole mobile phone production line.

Because the RF testing machine is expensive, normally, the vendors only have a single RF testing machine for testing a single mobile phone at one time in the RF test, in which it takes three-quarters of the total time of the testing step in the RF test, and one-quarter of the total time of the testing step in an idle time of the RF test, that is the time that the single RF testing machine waits when the mobile phone is set up.

Therefore, on condition of only a single RF testing machine is provided at one time, the next mobile phone cannot be performed on the set up step only if the mobile phone in front on the testing line is removed from the RF testing machine. In other words, the RF test have to wait in the idle for one of a quarter times of the total time of the testing step whenever a mobile phone is doing test.

Thus, since the RF testing machine cannot be utilized adequately frequently, the idle time of the RF test is redundant in the total time of the RF test, and that further leads to low usage efficiency in this testing step, and high production costs of the mobile phones.

SUMMARY

A radio frequency testing system and a method of performing a radio frequency (RF) test on a plurality of mobile communication devices by the testing system are provided.

In one aspect, the radio frequency (RF) testing system connects to a plurality of mobile communication devices simultaneously for performing a pre-set procedure and an RF test on each of the mobile communication devices in sequence. The system includes an RF testing device, a switch device and a controlling device. The RF testing device is used for performing the RF test on each of the mobile communication devices in turn. The switch device connects to the RF testing device and each of the mobile communication devices respectively for regulating an electrical connection between the RF testing device and any one of the mobile communication devices. The controlling device electrically connects to the switch device, the RF testing device, and each of the mobile communication devices, respectively.

When one of the mobile communication devices is performing the RF test, the controlling device causes at least one of the rest of the mobile communication devices to perform the pre-set procedure respectively. Once the mobile communication device has finished performing the RF test, the controlling device causes the switch device to electrically connect the RF testing device and the one of the rest of the mobile communication devices that has finished performing the pre-set procedure, instead of electrically connecting the RF testing device and the mobile communication device which has finished performing the RF test, for performing the RF test on the mobile communication device electrically connected to the RF testing device. In one of the embodiments, the radio frequency testing system further has a plurality of power sources. The power sources electrically connect to the controlling device and the mobile communication devices, respectively. The controlling device causes at least one of the power sources to provide power for one of the mobile communication devices when performing the pre-set procedure or the RF test.

In the other one of the embodiments, the radio frequency testing system further has a plurality of test beds. Each of the test beds electrically connects to the controlling device, the switch device, and one of the power sources for holding one of the mobile communication devices.

In the embodiment, each of the test beds is an RF shielding box. The RF shielding box is used for blocking radio frequency electromagnetic radiation between one of the mobile communication devices and the outside of the RF shielding box.

In another one of the embodiments, the RF testing device is a multi-test testing device having a signal source module and an RF analysis module.

In another one of the embodiments, the switch device is a matrix switch. The matrix switch comprises at least two first ports, a plurality of second ports, and a matrix switch circuit. The first ports are used for connecting the matrix switch to the signal source module and the RF analysis module, respectively. The second ports are used for connecting the matrix switch to the mobile communication devices, respectively. The matrix switch circuit has a switch element for making or breaking an electrical connection between each of the first ports and each of the second ports, so as to make or break an electrical connection between the signal source module or the RF analysis module and any one of the mobile communication devices.

Furthermore, in the embodiment, the controlling device provides a control interface having a procedure-performance monitoring table, an RF test specification table, and an RF variables setting table. The procedure-performance monitoring table includes a procedure-performance window for showing execution details of the pre-set procedure or the RF test performed on one of the mobile communication devices. The RF test specification table is used for showing detailed information of specification of the RF testing performed on one of the mobile communication devices. The RF variables setting table is for showing RF variables.

In another aspect, the method of performing a radio frequency (RF) test on a plurality of mobile communication devices is applicable to an RF testing system connected to the plurality of mobile communication devices, and the RF testing system includes an RF testing device. The method includes a step of the RF testing device performing the RF test on a first mobile communication device of the mobile communication devices, a step of performing a pre-set procedure on at least one of the rest of the mobile communication devices respectively, a step of determining whether a second mobile communication device of the rest of the mobile communication devices has finished performing the pre-set procedure, a step of determining whether the RF testing device has finished performing the RF test on the first mobile communication device and is therefore in an idle condition when it is determined that the second mobile communication device has finished performing the pre-set procedure, a step of electrically connecting the RF testing device and the second mobile communication device when it is determined that the RF testing device has finished performing the RF test on the first mobile communication device and is in the idle condition, and a step of the RF testing device performing the RF test on the second mobile communication device.

Furthermore, in one embodiment, the step of conducting the electrical connection between the RF testing device and the second mobile communication device, further comprises a step of electrically disconnecting the RF testing device and the first mobile communication device by opening a first switch element of a switch device, a step of electrically connecting the RF testing device and the second mobile communication device by closing a second switch element of the switch device.

In one of the embodiments, when the RF testing device is not in the idle condition, the method further includes a step of the second mobile communication device awaiting connecting to the RF testing device, and a step of continually determining whether the RF testing device has finished performing the RF test on the first mobile communication device.

In the other one of the embodiments, the pre-set procedure comprises a step of turning on a power source for the one of the rest of the mobile communication devices, a step of reading an identification number of said at least one of the rest of the mobile communication devices, and a step of configuring said at least one of the rest of the mobile communication devices into a mode of being ready for the RF test.

In another one of the embodiments, the step of connecting the RF testing device and the second mobile communication device comprises a step of electrically disconnecting the RF testing device from the first mobile communication device by opening a first switch element of a switch device, and a step of electrically connecting the RF testing device and the second mobile communication device by closing a second switch element of the switch device.

It is to be understood that both the foregoing general description and the following detailed description are examples, and are intended to provide further explanation of the invention as claimed.

BRIEF DESCRIPTION OF THE DRAWINGS

These and other features, aspects and advantages of the present disclosure will become better understood with regard to the following description, appended claims and accompanying drawings where:

FIG. 4B is a diagram of an RF test specification table shown on the control interface according to one embodiment of the invention.

FIG. 4C is a diagram of an RF variables setting table shown on the control interface according to one embodiment of the invention.

DESCRIPTION OF THE PREFERRED EMBODIMENTS

Figure 1:
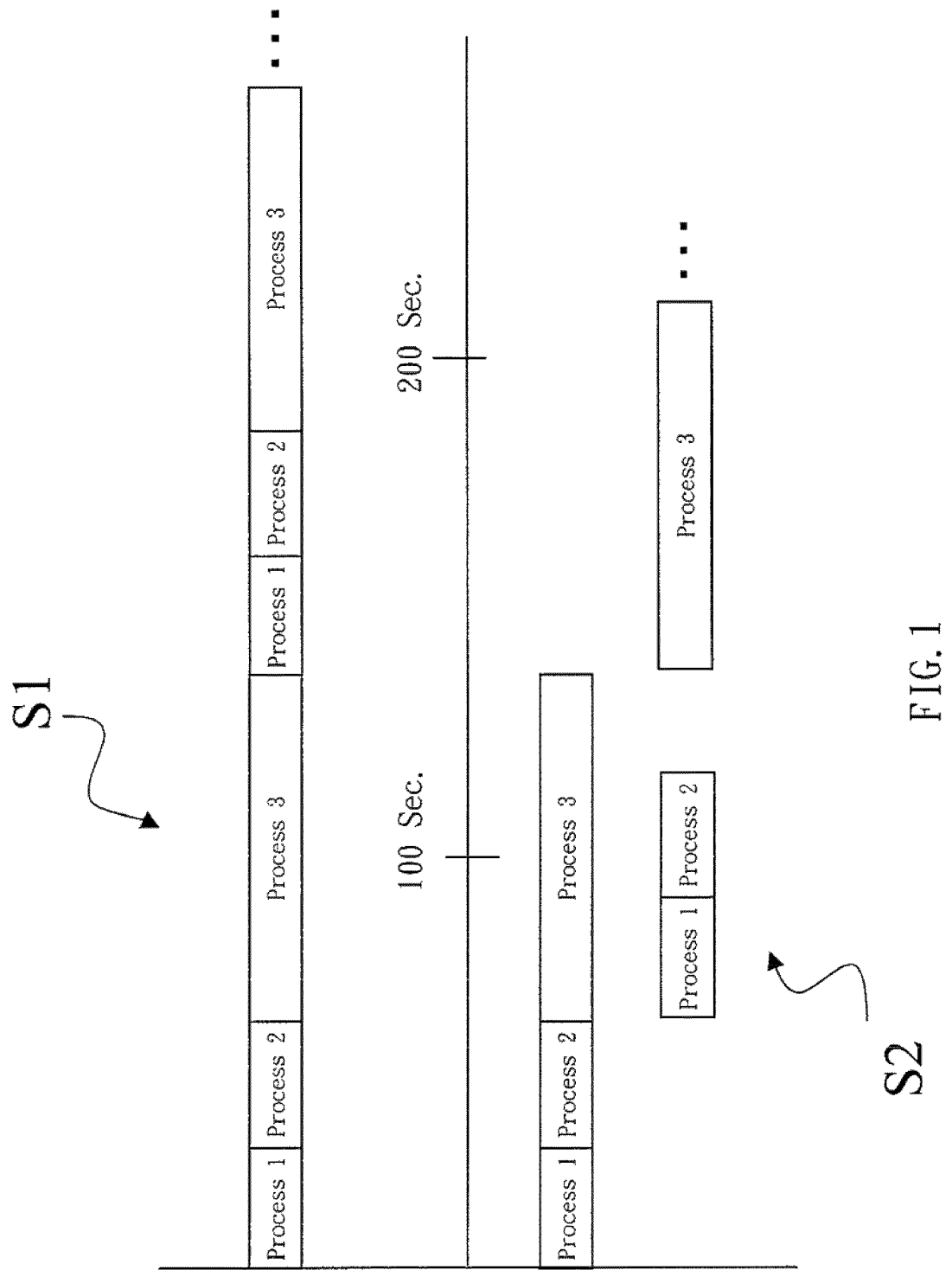
FIG. 1 is a time chart of a conventional process routine schedule S1 and an improved process routine schedule S2 for performing an RF test on mobile communication devices.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a time chart of a conventional process routine schedule S1 and an improved process routine schedule S2 for performing an RF test on mobile communication devices.

The procedure of a radio frequency (RF) test on the mobile communication devices can be divided into 3 processes mentioned as follows for the mobile communication devices:

Process 1: "Placing a Testing Object for Test"

In this process, each of the mobile communication devices to undergo the RF test will be placed on a test zone. The period of the process 1 can be, for example, about 8 seconds.

Process 2: "Setting Up the Testing Object to be Ready"

After Process 1, the mobile communication device placed on the test zone will be turned on and set up to a test mode in which it is ready to undergo the RF test. The period of the process 2 can be, for example, about 23 seconds.

Process 3: "Testing the Testing Object"

After Process 2, the RF test will be performed on the mobile communication device by an RF testing device. The period of the process 3 can be, for example, about 98 seconds.

As mentioned above, it takes in total about 129 seconds for performing process 1 through process 3 in the conventional routine schedule S1 (see FIG. 1), in which the process 3 takes about 76% of the total time of the procedure, and the process 1 and the process 2 together take about 24% of the total time of the procedure, which is the period of time that the RF testing device is idle.

In view of this, an embodiment of the invention is described here which is an RF testing system, and a method of performing an RF test on a plurality of mobile communication devices by the RF testing system. Some of the goals of the invention are to shorten the total time for the RF test, cut down the idle time of the RF testing device, and thereby improve the usage efficiency of the RF testing device.

To make the explanation easier, the process 1 and the process 2 are together regarded as one, which is called a "pre-set procedure", and the process 3 is called an "RF test".

Referring to FIG. 1 again, since the period for the RF test is much longer than the period for the pre-set procedure, therefore, when one of the mobile communication devices has finished performing the pre-set procedure, and starts to perform the RF test, the invention causes another one (or more) of the rest of the mobile communication devices to perform the pre-set procedure in the meantime. Therefore, as soon as the mobile communication device has finished performing the RF test, another mobile communication device which also has finished performing the pre-set procedure can directly enter on performing the RF test. Thus, the RF testing device can be utilized more efficiently, such that the idle time of the RF testing device will be cut down.

As shown in FIG. 1, when the same quantity of mobile communication devices are tested according to both the conventional routine schedule S1 and the improved routine schedule S2, respectively, testing according to the improved routine schedule S2 has shortened the testing period compared to testing according to the conventional routine schedule S1. Thus, the improved routine schedule S2 also avoids the RF testing device being idle while waiting for a mobile communication device still performing the pre-set procedure.

Figure 2:
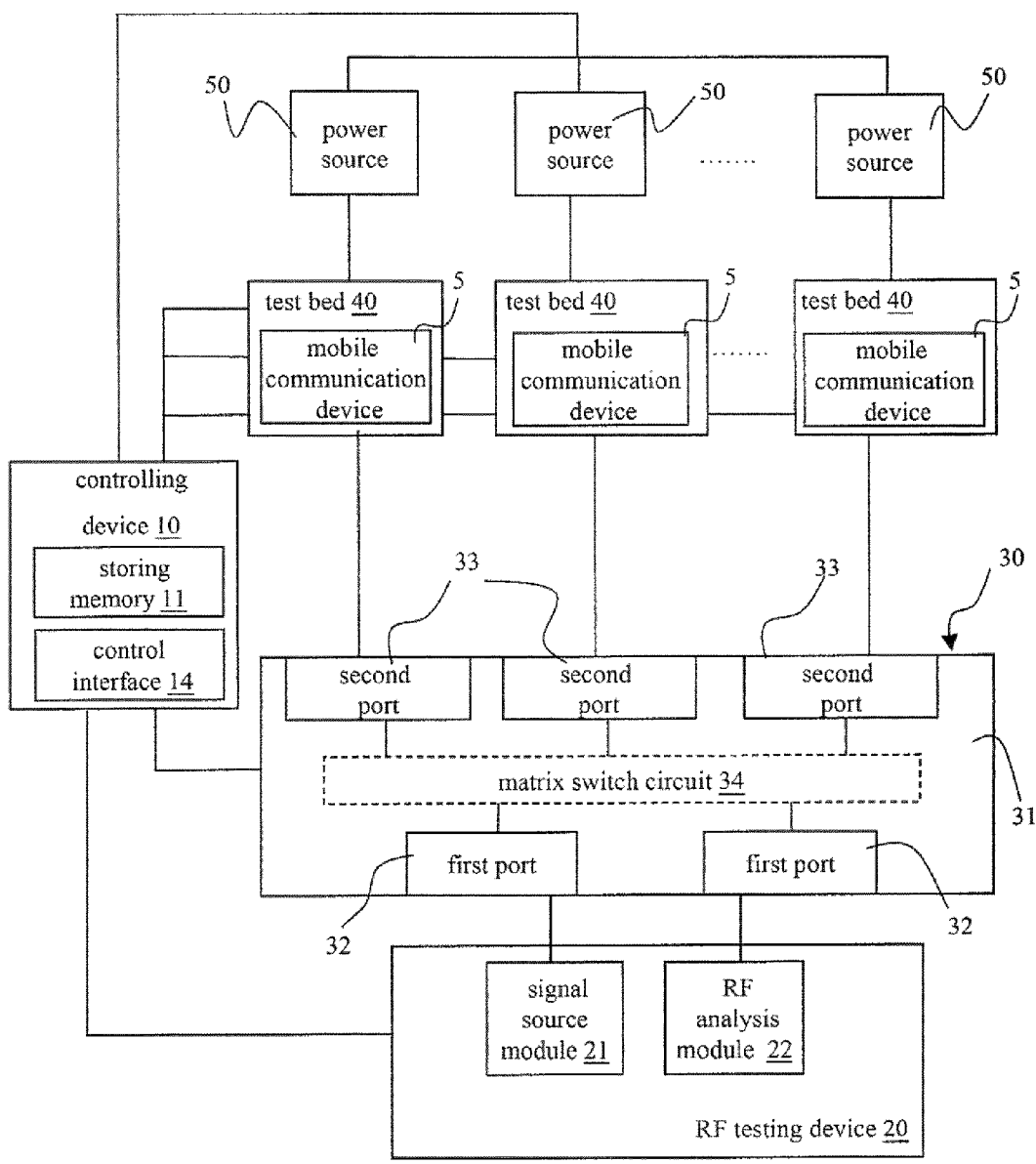
FIG. 2 is a block diagram of an RF testing system according to one embodiment of the invention.

FIG. 2 is a block diagram of an RF testing system according to one embodiment of the invention. The RF testing system 1 connects to a number of mobile communication devices 5 simultaneously for performing a pre-set procedure and an RF test on each of the mobile communication devices in turn. The mobile communication devices 5, e.g. cell phones, notebooks, GPS devices etc., can be defined as any electrical devices capable of transceiving signals of at least one format complying with any RF standard such as GSM&WCDMA Cal, GSM Finnal, WCDMA Finnal, HSDPA, or BT WIFI.

With reference to FIG. 2, the RE testing system 1 includes a controlling device 10, an RF testing device 20, a switch device 30, a number of test beds 40, and a number of power sources 50. Each of test beds 40 holds one mobile communication device 5. The controlling device 10, e.g. a computing device, electrically connects to the RF testing device 20, the switch device 30, the test beds 40, the power sources 50, and the mobile communication devices 5, respectively. Thus, the controlling device 10 can send some request signals to command those elements connected to it to perform appropriate actions, receive feedback responses from those elements after performing the action, and perform the pre-set procedure on each of the mobile communication devices 5. The pre-set procedure may include steps of turning on the mobile communication device 5, reading an identification number (e.g. a serial number S/N) of the mobile communication device 5, and configuring the mobile communication device 5 into a mode in which it is ready for the RF test.

The RF testing device 20 performs the RF test on each of the mobile communication devices 5 in turn. The RF testing device 20, for example, can be an RF multi-test testing device, which has a signal source module 21 and an RF analysis module 22. The signal source module 21 is for reproducing a test signal, and the RF analysis module 22 is for analyzing a RF signal from the mobile communication device 5. Some of the goals of this invention are to raise the usage efficiency of the RF testing device 20, and cut down the idle time of the RF testing device 20.

The switch device 30 electrically connects to the RF testing device 20 and each of the test beds 40, respectively. The switch device 30 is able to regulate an electrical connection between the RF testing device 20 and anyone of the mobile communication devices 5. The meaning of regulating herein includes making, breaking or changing the electrical connection. Thus, the RF testing device 20 is electrically connected to each of the mobile communication devices 5 in turn by switching the switch device 30, so that the RF testing device 20 is able to perform the RF test on the mobile communication device 5. In addition, the switch device 30 can be a matrix switch 31 in this embodiment.

Figure 3:
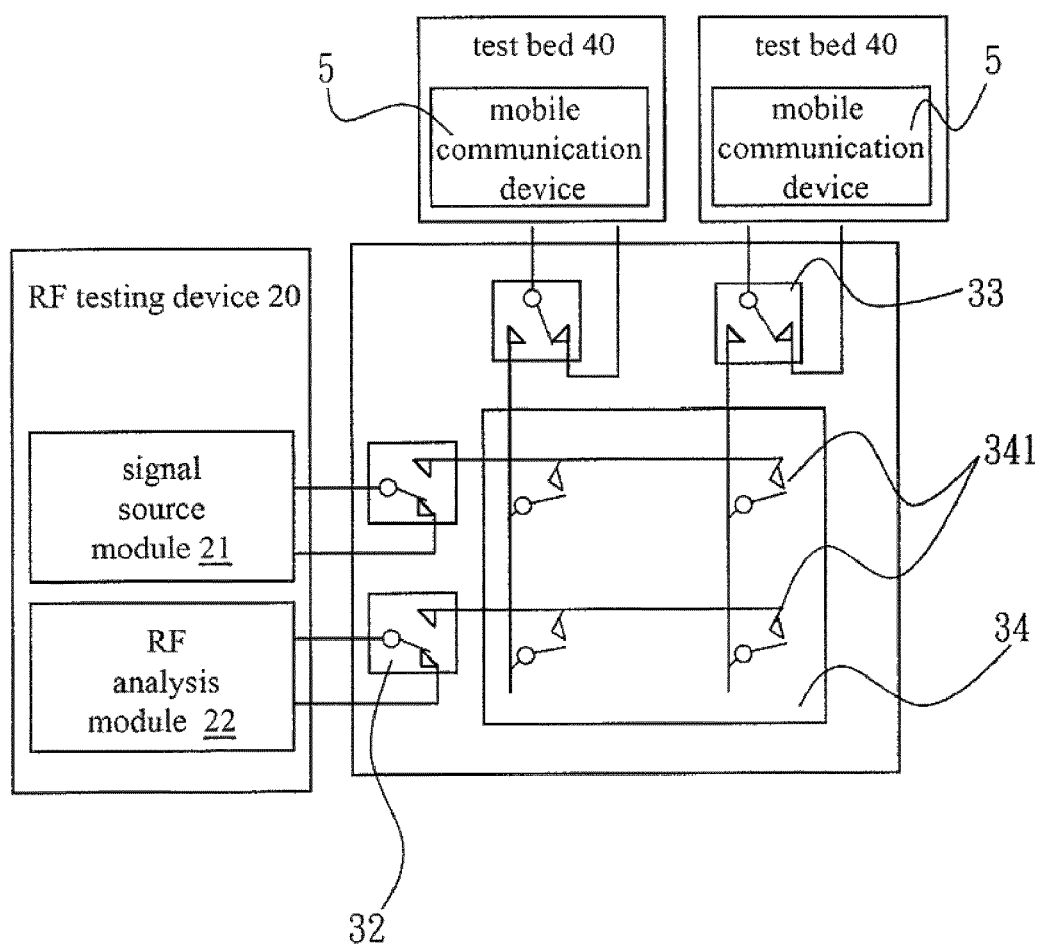
FIG. 3 is a diagram illustrating connections within the switch device 30 according to one embodiment of the invention.

FIG. 3 is a diagram illustrating connections within the switch device 30 according to one embodiment of the invention.

The matrix switch 31 in this embodiment has at least two first ports 32, a plurality of second ports 33, and a matrix switch circuit 34. A port may be, for example, an interface, a connection, or a connector. The two first ports 32 are disposed on one side of the matrix switch 31, and are for connecting the matrix switch 31 to the signal source module 21 and the RF analysis module 22, respectively. The second ports 33 are disposed on the other side of the matrix switch 31, and are for connecting the matrix switch 31 to the mobile communication devices 5, respectively, via its test bed 40.

The matrix switch circuit 34 is disposed in the matrix switch 31 and includes switch elements 341 in this embodiment. The switch elements 341 is for making or breaking an electrical connection between each of the first ports 32 and each of the second ports 33 so as to make or break an electrical connection between the signal source 21 or the RF analysis module 22 and any one of the mobile communication devices 5.

When one of the mobile communication devices 5 performs the RF test, the matrix switch circuit 34 is controlled to make an electrical connection between the RF testing device 20 (i.e. the signal source module 21 or the RF analysis module 22) and the mobile communication device 5 through a switch element 341, and break an electrical connection between the RF testing device 20 and the rest of the mobile communication devices 5.

On the other hand, when the mobile communication device 5 has finished performing the RF test, the matrix switch circuit 34 is controlled to break the electrical connection between the RF testing device 20 and the mobile communication device 5, and make an electrical connection between the RF testing device 20 and another one of the rest of the mobile communication devices 5 which has finished performing the pre-set procedure.

Each of the test beds 40 is electrically connected to the controlling device 10, the switch device 30 and one of the power sources 50. Each test bed 40 may be an RF shielding box in this embodiment for blocking radio frequency electromagnetic radiation between one of the mobile communication devices 5 and the outside of the RF shielding box.

When one of the mobile communication devices 5 is placed into a test bed 40, the mobile communication device 5 can be electrically connected to or disconnected from the switch device 30, the controlling device 10, and one of the power sources 50 through the test bed 40. Therefore, the cumbersome way of physically disconnecting a mobile communication device 5 from the corresponding power source 50, the switch device 30, and the controlling device 10 and then physically connecting another mobile communication device 5 to them can be avoided and thus the time to be spent for doing so is saved. Thus, connecting the mobile communication device 5 to the switch device 30, the controlling device 10, and one of the power sources 50 can be simplified, and the time needed for the connecting can be cut down as the mobile communication device 5 is replaced by another mobile communication device 5.

The power sources 50 are respectively electrically connected to the controlling device 10, and the mobile communication devices 5 through the corresponding test beds 40 (e.g. RF shielding boxes). The controlling device 10 causes at least one of the power sources 50 to provide power for one of the mobile communication devices 5 when performing the pre-set procedure or the RF test. Thus, the RF testing device 20 will test whether the RF communications by the mobile communication device 5 under different power provided conform to an RF standard.

Since the time a mobile communication device 5 takes to perform the RF test is much longer than the time it takes to perform the pre-set procedure, as mentioned above, the more test beds 40 and RF testing devices 20 which are provided, the more time for RF testing multiple mobile communication devices 5 saved, the less idle time of the RF testing device 20, and thus raising the usage efficiency of the RF testing device 20.

However, considering the cost of and budget for buying test beds 40 and RF testing devices 20, and also taking into account space limitations of constructing the RF testing system 1, the RF testing system 1 in an embodiment has only two mobile communication devices 5 (hereinafter called first mobile communication device 5 and second mobile communication device 5) for performing the RF test. Generally, apart from a single controlling device 10, RF testing device 20, and switch device 30, the quantity of the test beds 40 (e.g. RF shielding box), and that of the power sources 50 should match the quantity of the mobile communication devices 5.

Figure 4A:
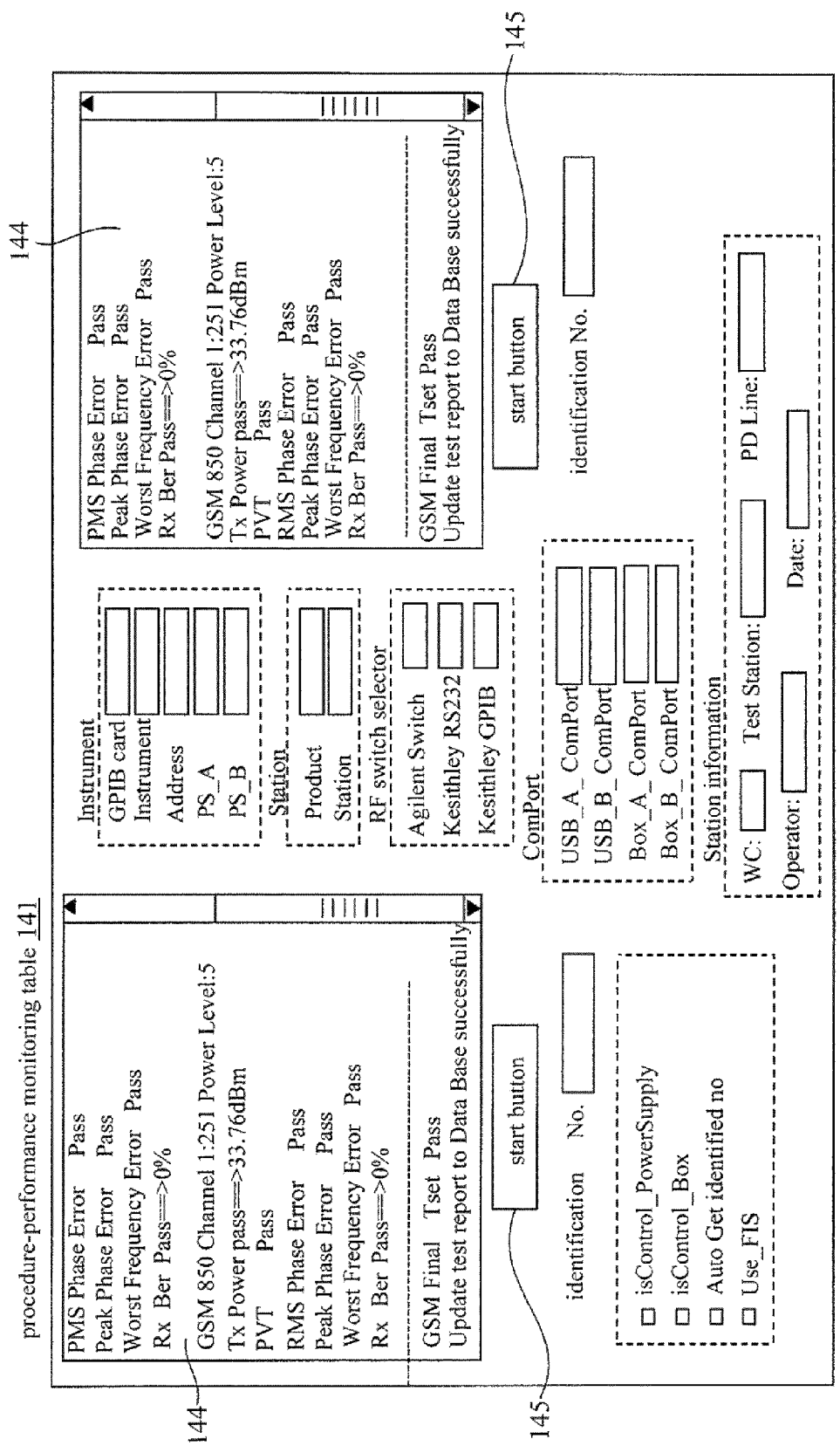
FIG. 4A is a diagram of a procedure-performance monitoring table shown on a control interface according to one embodiment of the invention.

The controlling device 10 also provides a control interface 14 for a tester to control the test and monitor the testing conditions of those testing mobile communication devices 5. FIG. 4A to FIG. 4C are diagrams of a procedure-performance monitoring table 141, an RF test specification table 142, and an RF variables setting table 143, respectively, shown on the control interface 14, according to an embodiment of the invention.

The control interface 14 shows a procedure-performance monitoring table 141, an RF test specification table 142, and an RF variables setting table 143. The procedure-performance monitoring table 141 in this embodiment has a plurality of procedure-performance windows 144 and start buttons 145 (e.g. two procedure windows 144 and two start buttons 145 are shown in FIG. 4A). Each procedure-performance window 144 shows execution details of the pre-set procedure or the RF test performed on each of the testing mobile communication devices 5. Each start button 145 is used to initiate the pre-set procedure or the RF test. Each of the testing mobile communication devices 5 corresponds to one procedure window 144 and one start button 145. Therefore, the tester is able to be aware of the execution details of the pre-set procedure or the RF test performed on each of the testing mobile communication devices 5 through the corresponding procedure window 144. The execution details include information of whether the test is passed or failed.

The RF test specification table 142 is for showing detailed information of specification of the RF testing, and the RF variables setting table 143 is for setting values of the RF variables. Therefore, the tester also can obtain the detailed information of specification of RF testing through the RF test specification table 142, and modify, adjust, or customize the values of the RF variables according to the RF variables setting table 143.

Figure 5:
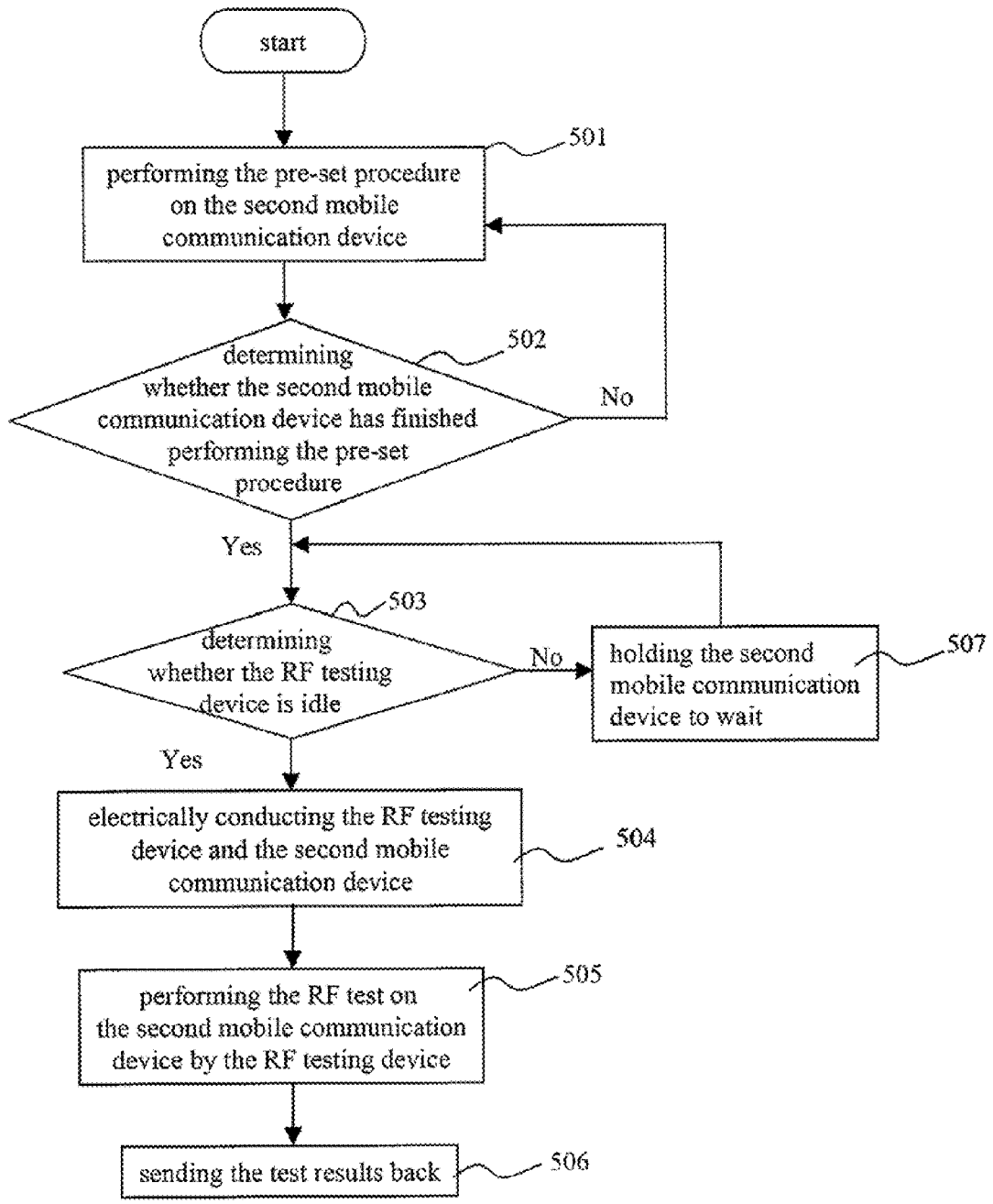
FIG. 5 is a flow chart of a method of performing a radio frequency test on a plurality of mobile communication devices according to one embodiment of the invention.
Figure 5A:
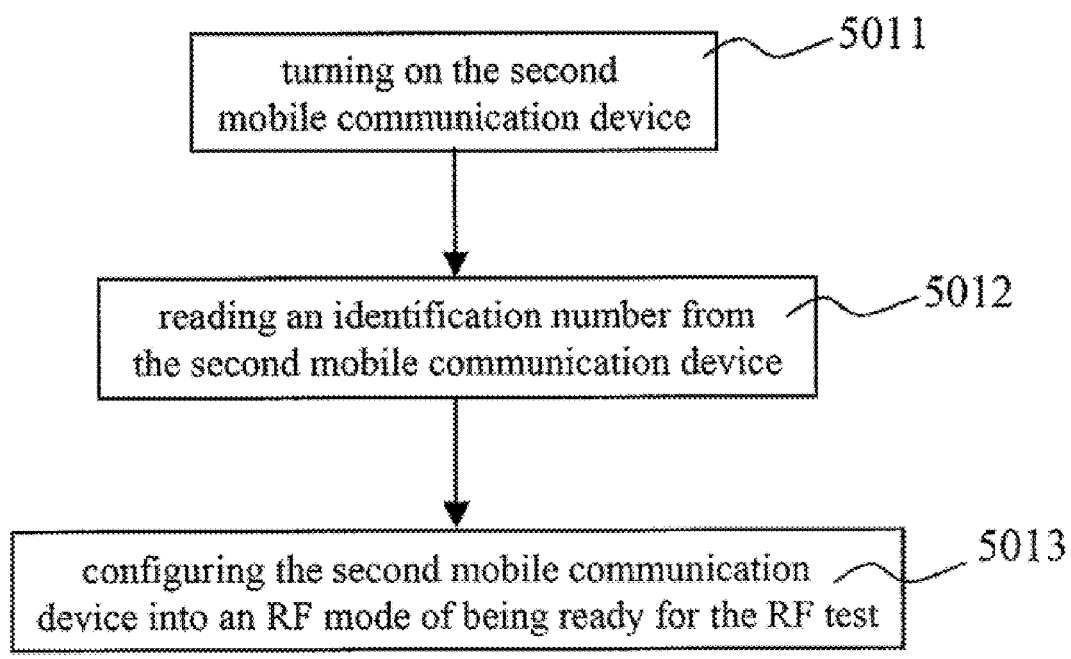
FIG. 5A is a detailed flow chart of a step (501).

FIG. 5 is a flow chart of a method of performing a radio frequency test on a plurality of mobile communication devices according to one embodiment of the invention, and FIG. 5A is a detailed flow chart of a step (501).

With reference to FIG. 5 and FIG. 5A, when the first mobile communication device 5 and the second mobile communication device 5 are placed into different RF shielding boxes, and the first mobile communication device 5 has already started to perform the RF test, the controlling device 10 operates according to the following steps:

Step (501): Performing the Pre-Set Procedure on the Second Mobile Communication Device 5

In order to avoid causing conflicts due to sharing the same source of the controlling device 10, the controlling device 10 generates different thread codes for separately performing the pre-set procedure on different mobile communication devices 5. The pre-set procedure performed in Step (501) includes the steps: in Step (5011), a power source for the second mobile communication device 5 is turned on, and appropriate power is provided by the corresponding power source 50; in Step (5012), an identification number of the second mobile communication device 5 is read, and shown on the control interface 14 for identification; and in Step (5013), the second mobile communication device 5 is configured into an RF mode in which the second mobile communication device 5 is ready for the RF test.

Step (502): Determining Whether the Second Mobile Communication Device 5 has Finished Performing the Pre-Set Procedure In this step, the controlling device 10 communicates with the second mobile communication device 5, and determines whether the second mobile communication device 5 has finished performing the pre-set procedure by the procedure window 144. If the determination is positive, proceed to Step (503); otherwise, proceed to the Step (501).

Step (503): Determining Whether the RF Testing Device 20 is in an Idle Condition In this step, when the second mobile communication device 5 has finished in the pre-set procedure, the controlling device 10 communicates with the RF testing device 20, and determines whether the RF testing device 20 has finished performing the RF test on the first mobile communication device 5, and has been in an idle condition.

If the determination is positive, it means that the RF testing device 20 has finished performing the RF test on the first mobile communication device 5. Thus proceed to Step (504). Otherwise if the determination is negative, it means that the first mobile communication device 5 is still performing the RF test. Thus, proceed to Step (507);

Step (504): Electrically Connecting the RF Testing Device 20 and the Second Mobile Communication Device 5

In order to perform the RF test on the second mobile communication device 5 by the RF testing device 20, the controlling device 10 in this step requests the switch device 30 to open a corresponding switch element 341 for breaking an electrical connection between the first mobile communication device 5 and the RF testing device 20, and then to close another corresponding switch element 341 for making an electrical connection between the second mobile communication device 5 and the RF testing device 20.

Step (505): Performing the RF Test on the Second Mobile Communication Device 5 by the RF Testing Device 20

The controlling device 10 in this step requests the RF testing device 20 to perform the RF test on the second mobile communication device 5.

Step (506): Optionally Sending Back the Test Results

In this step, the controlling device 10 will acquire the test results from the RF testing device 20, and send the test results to a storing memory 11 after the first or second mobile communication device 5 has finished performing the RF test. Thus, the tester may use and study the test results in the future.

Step (507): Holding the Second Mobile Communication Device 5 to Wait

In this step, since the first mobile communication device 5 is still performing the RF test by the RF testing device 20, the controlling device 10 arrange for the second mobile communication device 5 to await connecting to the RF testing device 20, and proceed back to Step (503) in which to continually determine whether the RF testing device 20 has finished performing the RF test on the first mobile communication device 5.

Since the second mobile communication device 5 has finished performing the pre-set procedure, the second mobile communication device 5 may directly enter on performing the RF test as soon as the RF testing device 20 is available. When the first mobile communication device 5 has finished performing the RF test, not only the first mobile communication device 5 can be removed from the RF shielding box, but a third mobile communication device 5 can be put into the empty RF shielding box to perform the pre-set procedure by pressing the start button 145.

Thus, when testing a large quantity of the mobile communication devices 5, the RF testing system 10 apparently shortens the total time for performing the RF test procedure, cuts down the idle time of the RF testing device 20, and thereby improves the usage efficiency of the RF testing device 20.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A radio frequency (RF) testing system connected to a plurality of mobile communication devices simultaneously for performing a pre-set procedure and an RF test on each of the mobile communication devices in sequence, the system comprising:
    an RF testing device for performing the RF test on each of the mobile communication devices in turn;
    a switch device connected to the RF testing device and each of the mobile communication devices respectively for regulating an electrical connection between the RF testing device and any one of the mobile communication devices; and
    a controlling device electrically connected to the switch device, the RF testing device, and each of the mobile communication devices, respectively,
    wherein when one of the mobile communication devices is performing the RF test, the controlling device causes at least one of the rest of the mobile communication devices to perform the pre-set procedure respectively, and
    when said one mobile communication device has finished performing the RF test, the controlling device causes the switch device to electrically connect the RF testing device and one of the rest of the mobile communication devices that has finished performing the pre-set procedure, instead of electrically connecting the RF testing device and the one mobile communication device, for performing the RF test on said one of the rest of the mobile communication devices.

2. The radio frequency testing system of claim 1, further comprising:
    a plurality of power sources electrically connected to the controlling device and the mobile communication devices, respectively,
    wherein the controlling device causes at least one of the power sources to provide power for one of the mobile communication devices when performing the pre-set procedure or the RF test.

3. The radio frequency testing system of claim 2, further comprising:
    a plurality of test beds, each of the test beds electrically connected to the controlling device, the switch device and one of the power sources for holding one of the mobile communication devices.

4. The radio frequency testing system of claim 3, wherein each of the test beds is an RF shielding box for blocking radio frequency electromagnetic radiation between one of the mobile communication devices and the outside of the RF shielding box.

5. The radio frequency testing system of claim 1, wherein the RF testing device is a multi-test testing device having a signal source module and an RF analysis module.

6. The radio frequency testing system of claim 5, wherein the switch device is a matrix switch, the matrix switch comprises:
    at least two first ports for connecting the matrix switch to the signal source module and the RF analysis module, respectively;
    a plurality of second ports for connecting the matrix switch to the mobile communication devices, respectively; and
    a matrix switch circuit comprising a switch element for making or breaking an electrical connection between each of the first ports and each of the second ports so as to make or break an electrical connection between the signal source module or the RF analysis module and any one of the mobile communication devices.

7. The radio frequency testing system of claim 1, wherein the controlling device comprises a control interface for showing a procedure-performance monitoring table, wherein the procedure-performance monitoring table includes a procedure-performance window for showing execution details of the pre-set procedure or the RF test performed on one of the mobile communication devices.

8. The radio frequency testing system of claim 7, wherein the controlling device comprises a control interface for showing an RF test specification table for showing detailed information of specification of the RF testing.

9. The radio frequency testing system of claim 7, wherein the controlling device comprises a control interface for showing an RF variables setting table for setting values of the RF variables.

10. A method of performing a radio frequency (RF) test on a plurality of mobile communication devices, the method applicable to an RF testing system connected to the plurality of mobile communication devices and comprising an RF testing device, the method comprising:
    the RF testing device performing the RF test on a first mobile communication device of the mobile communication devices;
    performing a pre-set procedure on at least one of the rest of the mobile communication devices respectively;
    determining whether a second mobile communication device of the rest of the mobile communication devices has finished performing the pre-set procedure;
    if it is determined that the second mobile communication device has finished performing the pre-set procedure, determining whether the RF testing device has finished performing the RF test on the first mobile communication device and is therefore in an idle condition;
    if it is determined that the RF testing device has finished performing the RF test on the first mobile communication device and is in the idle condition, electrically connecting the RF testing device and the second mobile communication device; and the RF testing device performing the RF test on the second mobile communication device.

11. The method of claim 10, wherein if it is determined that the RF testing device is not in the idle condition, the method further comprises:

the second mobile communication device awaiting connecting to the RF testing device; and continually determining whether the RF testing device has finished performing the RF test on the first mobile communication device.

12. The method of claim 10, wherein the pre-set procedure comprises:

turning on a power source for said at least one of the rest of the mobile communication devices;

reading an identification number of said at least one of the rest of the mobile communication devices; and configuring said at least one of the rest of the mobile communication devices into a mode of being ready for the RF test.

13. The method of claim 10, wherein the step of connecting the RF testing device and the second mobile communication device comprises:

electrically disconnecting the RF testing device from the first mobile communication device by opening a first switch element of a switch device; and electrically connecting the RF testing device and the second mobile communication device by closing a second switch element of the switch device.

* * * * *